March 18, 1930. W. A. GEIGER 1,750,797
ANTIFRICTION BEARING
Filed Feb. 5, 1926
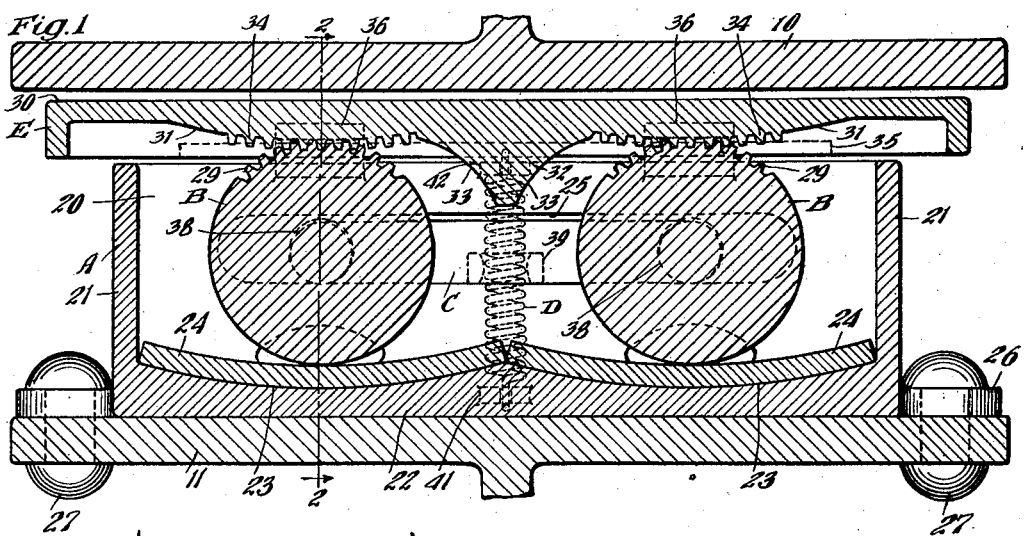
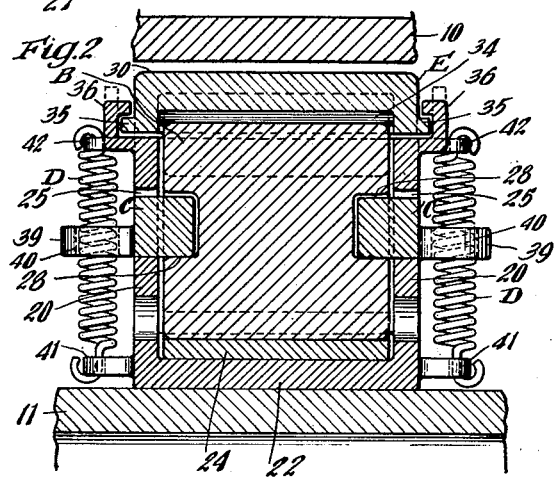
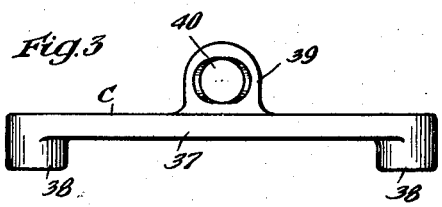
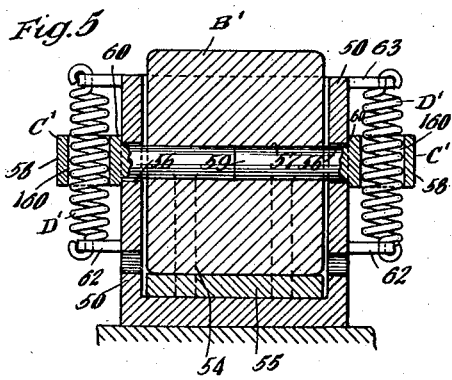
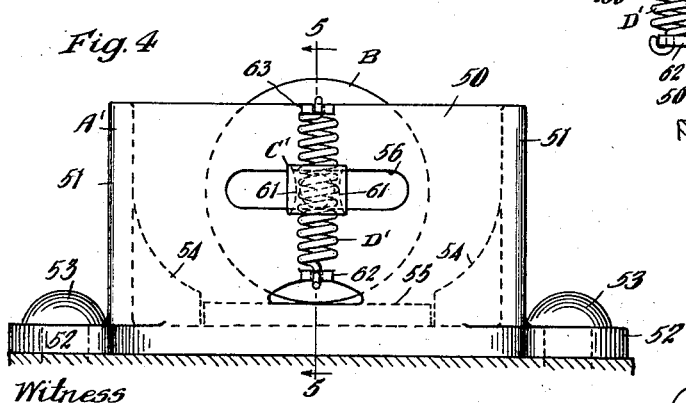
Witness
Hans M. Rachlitz
Inventor
William A. Geiger
By George I. Bright
His Atty.

Patented Mar. 18, 1930

1,750,797

UNITED STATES PATENT OFFICE

WILLIAM A. GEIGER, OF CHICAGO, ILLINOIS, ASSIGNOR TO W. H. MINER, INC., OF CHICAGO, ILLINOIS, A CORPORATION OF DELAWARE

ANTIFRICTION BEARING

Application filed February 5, 1926. Serial No. 86,171.

This invention relates to anti-friction bearings.

One object of the invention is to provide a simple, practical and efficient anti-friction bearing, especially adapted for railway car side bearings, in which the parts are so arranged that the anti-friction elements are automatically returned to normal centered position when free from load.

A more particular object of the invention is to provide a bearing of the above character, including a boxlike retainer with anti-friction elements disposed therein, together with vertically arranged helical springs at outer sides of said retainer, transmitting members removably connected to said anti-friction elements and engaging said springs, whereby movement of the anti-friction elements to either side of central position effects flexing of said springs intermediate their ends, which operate to return the element to, and maintain the same in central position when free from load, said springs serving to resiliently maintain the transmitting elements in engagement with the anti-friction elements, which in turn are held against removal from the housing by said transmitting elements.

A still further object of the invention is to provide a bearing of the character above referred to, in which a covering cap is utilized which bears upon the anti-friction elements, the bearing surfaces of said cap and of the retainer being arranged on parallel arcs whereby movement of the anti-friction elements to either side of central position does not cause elevation of said cap, and the curved bearing surfaces of the retainer have an effect in returning the anti-friction elements and cap to central position.

Other and further objects of the invention will more clearly appear from the description and claims hereinafter following.

In the drawing, forming a part of this specification, Fig. 1 is a vertical sectional view taken through the ends of the body and truck bolsters of a railway car, showing my improvements in connection therewith. Fig. 2 is a transverse sectional view, partly broken away, corresponding substantially to the line 2—2 of Fig. 1. Fig. 3 is a detailed top plan view of one of the transmitting and spacing members used in connection with the invention. Fig. 4 is a side elevational view of a modified form of the invention. And Fig. 5 is a transverse sectional view corresponding substantially to the line 5—5 of Fig. 4.

Referring first to Figs. 1 to 3 of the drawings, 10 denotes the underside of the body bolster, and 11 the upper side of the corresponding opposed truck bolster. The improved side bearing is shown as applied to the truck bolster and comprises broadly a mounting, retainer, or housing A, anti-friction means B—B, transmitting elements C—C; resilient elements D—D and a cap E.

The housing or retainer A as shown is of rectangular formation having vertically disposed side walls 20—20, and vertically disposed end walls 21—21. The bottom 22 of said housing includes a pair of longitudinally curved seats 23—23, upon each of which is mounted a concave bearing plate 24, the outer ends of said bearing plates abutting the end walls 21—21, and the inner ends of said plates being disposed in abutting relation. The side walls 20—20 are each provided with an elongated horizontally disposed guide slot 25 to accommodate the transmitting members C—C hereinafter described. The retainer A is provided at its opposite ends with securing flanges 26—26 through which extend rivets 27—27 which secure the retainer to the truck bolster.

The anti-friction elements B—B are two in number, one of the same being disposed upon each of the curved bearing plates 24—24. The anti-friction elements are similar in construction, in this instance being in the form of rollers each of which is provided with cylindrical sockets or recesses 28—28 in its opposite ends, the upper periphery of each roller B being provided with teeth or ribs 29 adapted to co-operate with the cap E.

The cap E is preferably rectangular in form, the top 30 of which is flat, and the under surface of which is provided with arcuate bearing faces 31—31, which are struck upon arcs adapted to extend in substantially parallel relation with the curved surfaces of the bearing plates 24—24, the central portion of the under surface of the cap having a depending projection 32, the opposite sides of which are rounded as indicated at 33 to provide stops for limiting movement of the cap longitudinally. Each bearing surface 31 is provided with a plurality of transversely disposed ribs or teeth 34 adapted to mesh with the teeth 29 on the anti-friction element B—B. The cap is secured to the housing A by means of laterally extending ledges 35—35 extending along its side faces adjacent the lower edges thereof, the housing A being provided with bendable lugs 36—36, said lugs being adapted to be bent from the position shown in dotted lines in Fig. 2 to the position shown in full lines in said figure, the lugs serving to maintain the cap against vertical endwise removal.

The transmitting means C—C are two in number, one being disposed upon each side of the housing. Each of said transmitting means is in the form of an elongated link 37 provided with inturned cylindrical portions 38—38 at its opposite ends, one of the cylindrical portions 38 being disposed in the socket 28 of each of the anti-friction elements B—B, the portion 37 of the transmitting member being arranged in the horizontal slot 25 in the adjacent side wall of the housing. Each of the transmitting members C is provided with a centrally disposed lateral projection 39, which has a central opening 40 extending therethrough, the walls 41 of said opening tapering in opposite direction.

The resilient means D—D are two in number and disposed upon opposite sides of the housing A. Each of said means comprises a helical spring, which extends through the opening 40 in the projection 39 of the transmitting member, the lower end of which spring being secured to a lug 41 formed at the lower portion of the side wall of the housing, and the opposite end of said spring being secured to the lug 42 secured adjacent the top edge of the housing, the arrangement being such that the projecting portion 39 of the transmitting element engages the spring at a point intermediate its ends as clearly shown in the drawings.

In operation upon relative movement of the body and truck bolsters so as to place the anti-friction bearing under load, the cap will move to either side of central position depending upon the direction of movement of the bolsters, said cap bearing upon the anti-friction rollers B—B, and causing movement of the same toward one end of the housing. During this movement the transmitting members C—C are carried with the rollers, resulting in flexing of the springs D—D intermediate their ends, and when load is removed from the anti-friction bearing, the transmitting elements under the pull exerted thereon by the springs, will return the rollers toward central position, and by reason of engagement of the teeth 29 with the teeth 34 of the bearing surfaces of the cap, said cap will be returned with the rollers to its initial central position.

By the above described arrangement it will be appreciated that the rollers B—B are positively held in spaced relation by the transmitting members which also serve to maintain the same in central position when free from load, the tooth and rack connection with the cap E also maintaining the cap in central position. If it is desired to disassemble the bearing for any reason the cap E may be first removed by bending the lugs 36 to permit such removal, and the rollers may be readily removed from the housing by flexing the springs D—D transversely so that the trunnions 38—38 of the transmitting members may be disconnected from the sockets 28—28 against the tension of the springs. In assembling the device the trunnions 38—38 of the transmitting members may be readily reengaged with the sockets in the rollers, and the cap E again secured in position.

Referring now to Figs. 4 and 5, a slightly different form of the invention is illustrated. In this construction the housing A' comprising a boxlike member having vertically disposed side walls 50—50 and end walls 51—51, securing lugs 52—52 being provided, through which are extended rivets 53—53 which secure the housing or retainer A' to the truck bolster. Each end wall 51—51 is provided with a curved abutment 54 which forms a stop to limit movement of the anti-friction element. The abutments 54—54 are spaced apart so that a bearing plate 55 may be disposed therebetween, as shown in dotted lines in Fig. 4. Each of the side walls 50—50 is provided with an elongated horizontally disposed guide slot 56.

The anti-friction element B' is in the form of a roller which loosely fits between the side walls 50—50 of the housing and is adapted to move longitudinally with reference to said housing in rolling engagement with the bearing plate 55. Said roller is provided with an axial bore 57 adapted to accommodate the transmitting members C'—C'.

The transmitting members C'—C' are two in number, one of which is arranged upon each side of the housing. Each transmitting member is provided with a headed portion 58 and a cylindrical shank portion 59, the shank portions of the said transmitting members being inserted through the slots 56 in the housing A' from opposite directions, and extend into the bore 57 in the roller, the shanks being of such length that the same have their inner ends in abutment when the shoulders 60 formed by the headed portions 58 of the transmitting members are in abutment with the side walls of the housing. Each of the headed portions 58 is provided with a bore 160, the walls of which are tapered in opposite directions as indicated at 61.

The resilient means D'—D' are two in number, one of the same being disposed at each side of the housing. Each resilient element C' is vertically disposed and extends through the bore 160 in the head of the related transmitting member, the lower end of each spring being secured to a lug 62 projecting laterally from the side wall of the housing, and the opposite end of the spring is secured to a similar lug 63 projecting from the side wall of the housing adjacent the top edge thereof.

In operation upon movement of the anti-friction element B' to either side of central position the transmitting members C'—C' will be carried therewith, resulting in flexing the springs D'—D' intermediate their ends, and when the load is released from said anti-friction element, the same will be returned to central position by reason of the force exerted upon the transmitting elements by reactive force of said springs.

While I have herein shown and described what I now consider the preferred manner of carrying out the invention, the same is merely illustrative, and I contemplate all changes and modifications that come within the scope of the claims appended hereto.

I claim:

1. In an anti-friction bearing, the combination with a retainer provided with horizontally extending guideways; and anti-friction means adapted to move to either side of central position with respect to said retainer; transmitting members detachably associated with said anti-friction means, said transmitting members extending through said guideways; and vertically arranged springs extending through said transmitting members to maintain the same in cooperative relation with said anti-friction means, said springs being adapted to be flexed intermediate their ends upon movement of said anti-friction means to either side of central position, whereby said antifriction means are returned to central position when free from load.

2. In an anti-friction bearing, the combination with a retainer having guideways in its side walls and provided with a bearing surface; a plurality of anti-friction elements adapted to move back and forth on said bearing surfaces; transmitting members detachably connected to said anti-friction elements so as to space the same, said transmitting members operating in said guideways and extending outwardly therethrough; and vertically arranged springs at each side of said housing operatively connected with said transmitting members and adapted to be flexed intermediate their ends by said members upon movement of said anti-friction means to either side of central position.

3. In an anti-friction bearing, the combination with a retainer provided with side and end walls, one of said side walls having a horizontally extending guide slot; anti-friction means adapted to move to either side of central position with respect to said retainer, said anti-friction means including an element provided with an axially disposed opening, a vertically disposed spring arranged at one side of said bearing and having its opposite ends secured to said retainer; and a transmitting member insertable through said guide slot into the axial openings in said element, said transmitting member engaging said spring and being maintained in position thereby, said transmitting element being adapted to flex said spring intermediate its ends upon movement of said anti-friction means to either side of central position.

4. In an anti-friction bearing, the combination with a retainer having side and end walls and being provided with longitudinally arranged concaved bearing surfaces, and with horizontally arranged guideways in its side walls; anti-friction elements arranged to move back and forth upon said bearing surfaces; a cap provided with convex bearing surfaces corresponding substantially in curvature with the bearing surfaces of said retainer; transmitting members connected with said anti-friction elements and operatively mounted in the guideways of said side walls; vertically disposed springs at opposite sides of said housing and connected to said transmitting members whereby movement of said anti-friction elements to either side of central position will effect flexing of said springs intermediate their ends so that reactive force of said springs will return said anti-friction elements to central position.

5. In a side bearing of the character described, the combination with a retainer secured to the truck bolster of a railway car, said retainer having means providing a concave bearing surface; of anti-friction means movable to and fro upon said bearing surface; a cap for said retainer having a convex bearing surface corresponding substantially in curvature with the concave bearing surface of said retainer, said convex bearing surface bearing upon said anti-friction means to permit movement of said cap on said anti-friction means and relatively to the latter and said retainer, said anti-friction means and said concave and convex bearing surfaces being so proportioned as to maintain the cap at the same level during its movements with respect to said retainer; means connecting said cap with said retainer to permit operative movements of the cap; and yieldable means co-operating with the said anti-friction means to directly return the 6. In a side bearing of the character described, the combination with a retainer secured to the truck bolster of a railway car, said retainer having means providing a concave bearing surface; of anti-friction means movable to and fro upon said bearing surface; a cap for said retainer having a convex bearing surface corresponding substantially in curvature with the concave bearing surface of said retainer, said convex bearing surface bearing upon said anti-friction means to permit movement of said cap on said anti-friction means and relatively to the latter and said retainer, said anti-friction means and said concave and convex bearing surfaces being so proportioned as to maintain the cap at the same level during its movements with respect to said retainer; means connecting said cap with said retainer to permit operative movements of the cap; and yieldable means co-operating with said anti-friction means to return the same to and maintain the same in central position with reference to said retainer when free from load, said anti-friction means being provided with teeth engageable with teeth on the convex bearing surface of said cap.

7. In a side bearing of the character described, the combination with a retainer secured to the truck bolster of a railway car, said retainer having means providing a concave bearing surface; of anti-friction means movable to and fro upon said bearing surface; a cap for said retainer having a convex bearing surface corresponding substantially in curvature with the concave bearing surface of said retainer, said convex bearing surface bearing upon said anti-friction means to permit movement of said cap on said anti-friction means and relatively to the latter and said retainer, said anti-friction means and said concave and convex bearing surfaces being so proportioned as to maintain the cap at the same level during its movements with respect to said retainer; means connecting said cap with said retainer to permit operative movements of the cap; elongated spring means having both of its ends connected to said retainer; transmitting elements connected with said anti-friction means and engageable with said spring means intermediate the ends thereof for flexing the same when said anti-friction means moves to either side of central position; and inter-engaging teeth on said anti-friction means and the convex surface of said cap, whereby the position of said cap is controlled by the position of said anti-friction means.

8. In an anti-friction bearing, the combination with a retaining member; of an anti-friction element arranged to move back and forth with respect to said retainer; a transmitting element engaged with the end of said anti-friction element to move in unison therewith; and spring member secured to said retaining member and having operative engagement with said transmitting element, to resist disengagement of said transmitting element from the anti-friction element, thereby holding the former in operative engagement with the end of the latter by its resiliency and being stressed when said anti-friction element is actuated from normal position, whereby said spring means is effective to return said anti-friction element to normal upon removal of the actuating force.

In witness that I claim the foregoing I have hereunto subscribed my name this 3rd day of February, 1926.

WILLIAM A. GEIGER.